United States Patent [19]
Darnell et al.

[11] 3,860,875
[45] Jan. 14, 1975

[54] THERMOCOUPLE-CONTROLLED OPERATIONAL AMPLIFIER CIRCUIT

[75] Inventors: Dana R. Darnell, Southgate; Clarence E. Harrison, Jr., Madison Heights, both of Mich.

[73] Assignee: Ford Motor Company, Dearborn, Mich.

[22] Filed: Jan. 4, 1974

[21] Appl. No.: 430,816

[52] U.S. Cl. .......................... 328/3, 328/1, 307/229, 307/310
[51] Int. Cl. .............................................. G01k 7/00
[58] Field of Search ................. 307/310, 229; 328/3; 340/227 R; 324/104

[56] References Cited
UNITED STATES PATENTS

| | | | |
|---|---|---|---|
| 3,248,654 | 4/1966 | Shiragaki | 328/3 |
| 3,624,525 | 11/1971 | Smith | 328/3 |

*Primary Examiner*—Rudolph V. Rolinec
*Assistant Examiner*—B. P. Davis
*Attorney, Agent, or Firm*—Robert W. Brown; Keith L. Zerschling

[57] ABSTRACT

A thermocouple-controlled operational amplifier circuit has a first impedance connected at one of its terminals to one input terminal to the operational amplifier. One lead of a thermocouple is connected to the other terminal of the first impedance. The other thermocouple lead is coupled to a second input to the operational amplifier. The junction formed between the first-mentioned thermocouple lead and the first impedance is maintained at a reference potential and a current is made to flow through the first impedance. The current through the first impedance varies as a function of the ambient temperature, the temperature of the thermocouple reference or cold junction. A semiconductor PN junction device, preferably having a negative temperature coefficient, is used to produce the temperature-responsive variation in the current in the first impedance. This current variation compensates the thermocouple for variations in its ambient or cold junction temperature. Potentiometer means having a movable arm and a second impedance, connected between the movable arm and the terminal of the first impedance connected to the first-mentioned amplifier input, is used to calibrate the amplifier circuit such that the output of the amplifier indicates the occurrence of a predetermined temperature at the thermocouple temperature-sensing (hot) junction. The potentiometer and second impedance circuit connections provide a variation of the current in the first impedance, which variation is a substantially linear function of the position of the movable potentiometer arm.

8 Claims, 1 Drawing Figure

PATENTED JAN 14 1975 3,860,875
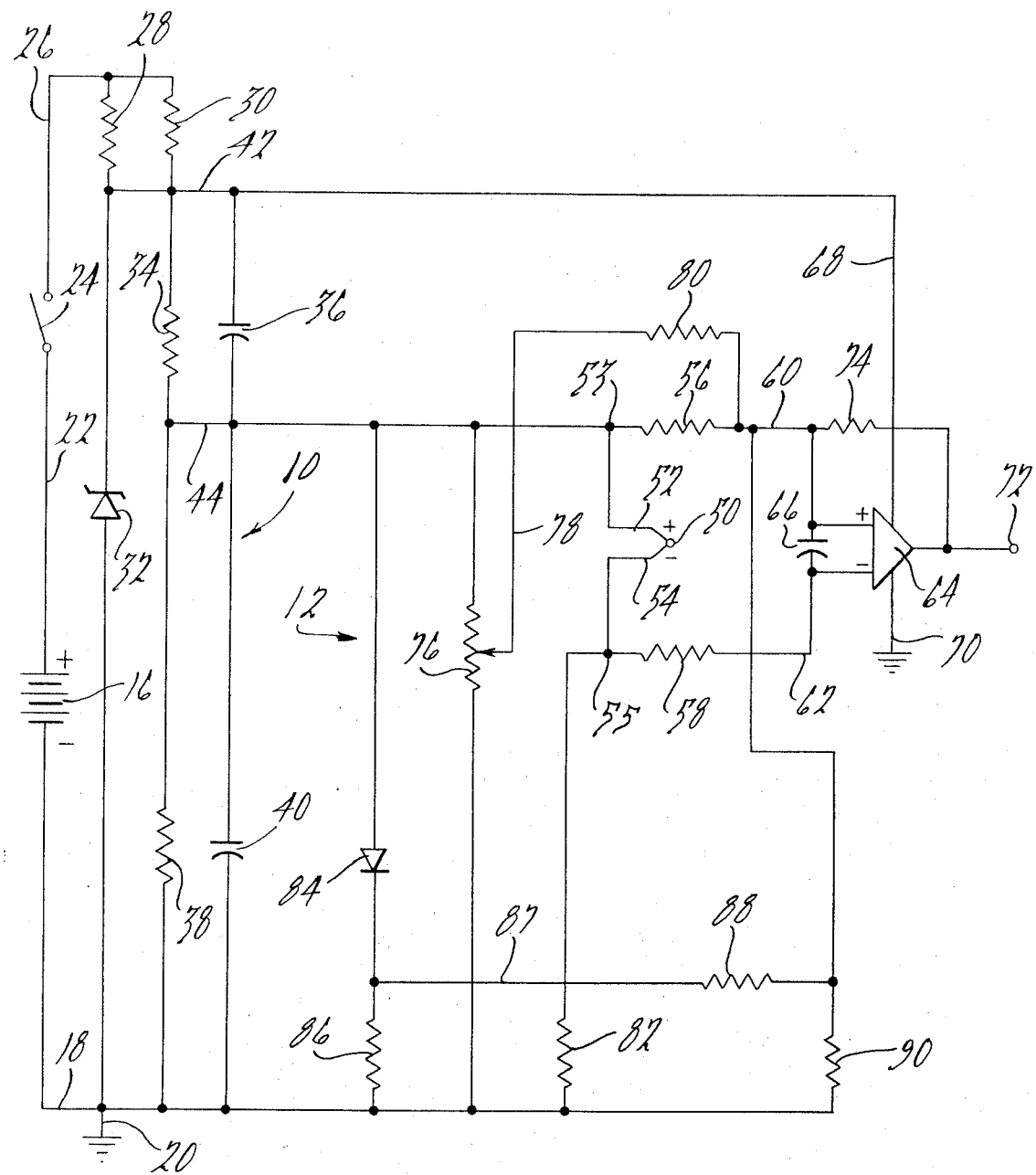

THERMOCOUPLE-CONTROLLED OPERATIONAL AMPLIFIER CIRCUIT

BACKGROUND OF THE INVENTION

This invention relates to a thermocouple-controlled operational amplifier circuit and, more particularly, relates to a circuit of this kind wherein the operational amplifier produces a desired voltage at its output in response to a predetermined temperature sensed by the temperature-sensing junction of the thermocouple.

As is well known, a thermocouple is a device formed from two electrical lead wires made from dissimilar metals and connected together at one point to form a temperature-sensing junction. The circuit connection at the ends of these lead wires opposite the temperature-sensing junction generally is referred to as the thermocouple reference junction or cold junction. The voltage or potential difference which appears across the thermocouple lead wires is proportional to the temperature difference between its temperature-sensing junction and its reference or cold junction.

For the purposes of the present invention, the term "ambient temperature" refers to the temperature at the reference or cold junction of the thermocouple, which temperature typically is determined primarily by the temperature of the medium surrounding the reference or cold junction.

Where the ambient temperature is likely to vary, it is necessary to compensate the thermocouple circuitry for such variation in ambient temperature if the millivoltage electrical signal produced by the thermocouple is to be utilized to sense a particular temperature. Otherwise stated, where a thermocouple output voltage signal is to be utilized to control the output of an operational amplifier and the amplifier is to produce a predetermined output signal at a predetermined temperature sensed by the temperature-sensing junction of the thermocouple, the input signal applied to the amplifier and derived from the thermocouple must be compensated for variations in ambient temperature. The present invention provides novel circuitry for accomplishing such thermocouple ambient temperature compensation.

In addition to the provision of ambient temperature compensation for a thermocouple, it is desirable to provide circuit means for calibrating the thermocouple-controlled operational amplifier circuit such that the amplifier produces a desired output signal level when the thermocouple produces a voltage signal corresponding to a predetermined temperature desired to be sensed at the thermocouple temperature-sensing junction.

SUMMARY OF THE INVENTION

The thermocouple-controlled operational amplifier circuit of the invention achieves ambient temperature compensation for the thermocouple and circuit calibration, which is a substantially linear function of the setting of the movable arm of a potentiometer, by circuitry which varies the current flowing through an impedance connected between one of the thermocouple leads and an input to the operational amplifier in response to changes in ambient temperature or changes in the setting of the movable potentiometer arm. In this way, temperature compensation and circuit calibration are obtained by variation of the current in, and resultant potential difference across, an impedance located in the amplifier input circuit.

A thermocouple-controlled operational amplifier circuit in accordance with the invention includes an operational amplifier having first and second input terminals and a first electrical impedance having a first terminal connected to the first amplifier input and having a second terminal connected to one lead of a thermocouple. The other lead of the thermocouple is coupled to the second input of the amplifier.

The circuitry includes means for establishing a reference voltage at the second terminal of the first impedance. Means for producing a current in the first impedance, which current varies as a function of ambient temperature and calibration setting of the circuitry, includes a potentiometer connected across the terminals of a source of electrical energy. The potentiometer has a movable arm which is connected through a second impedance to the first terminal of the first impedance. The above-described connection of the potentiometer to the first impedance is responsible for a portion of the current permitted to flow through the first impedance. The setting of the potentiometer arm determines the magntiude of this portion of the current flowing through the first impedance, the magnitude of this portion varying as a substantially linear function of the setting of the potentiometer arm.

An additional amount of current is permitted to flow through the first impedance as a result of a semiconductor PN-junction device connected in circuit with the first impedance. The PN-junction device is forward-biased when the reference voltage is applied to the second terminal fo the first impedance and, preferably, has a negative temperature coefficient such that the voltage across the PN junction decreases with increasing ambient temperature, the PN-junction device being located in a position where its voltage drop reflects the ambient temperature as previously defined.

The present invention is related to and used in a circuit described in concurrently filed and commonly assigned patent application Ser. No. 430,954 entitled "Thermocouple-Failure Warning Circuit," which patent application was filed in the names of C. E. Harrison and S. S. Yun, the former being a co-inventor in the present patent application.

The invention may be better understood by reference to the detailed description which follows and to the drawing, which is a schematic diagram of a thermocouple-controlled operational amplifier circuit in accordance with the invention.

DETAILED DESCRIPTION OF THE INVENTION

With reference now to the drawing, there is shown a schematic diagram of a thermocouple-controlled operational amplifier circuit which includes circuitry, generally designated by the numeral 10, used for the generation of various supply voltages and circuitry, generally designated by the numeral 12, which includes a thermocouple 50 and an operational amplifier 64. The lead line from the numeral 50 to the thermocouple points at its temperature-sensing junction, sometimes referred to as the thermocouple "hot" junction. The points 53 and 55 in the drawing may be regarded as the thermocouple reference or cold junction. It is across these thermocouple connection points 53 and 55 that the thermocouple output voltage occurs. Also, the operational amplifier 64 may be wired as a comparator capable of providing a voltage at its output 72 which is, when the amplifier's positive input is a few millivolts more positive than its negative input, substantially greater than the amplifier output voltage which occurs when its positive input is at a negative potential relative to the potential at its negative input. The amplifier output voltages may be used to actuate or de-actuate a controlled device at a predetermined temperature sensed by the thermocouple.

The circuitry shown in the drawing is particularly suitable for use in a motor vehicle. Thus, with particular reference now to the circuit 10 used to provide a plurality of electrical potentials, there is shown a DC source of electrical energy 16, which may be a motor vehicle 12 volt storage battery, having its negative terminal 18 forming a lead connected to ground at 20. The positive terminal of the source 16 is connected by a lead 22 to one pole of a switch 24 used to couple the battery source 16 to the remainder of the circuitry. The lead 26 from the switch 24 forms an unregulated voltage supply lead.

A pair of parallel-connected resistors 28 and 30 have their upper terminals connected to the unregulated voltage supply lead 26 and have their other terminals connected to a regulated voltage supply lead 42. The supply lead 42 obtains its regulation by virtue of its connection to the cathode of a zener diode 32 the anode of which is connected to the ground lead 18. A voltage divider is formed by the series combination of a resistor 34 and a resistor 38. A lead 44 is connected to the junction formed between the resistors 34 and 38. This lead 44 forms a regulated low-voltage supply lead, preferably, about 5.0 volts, whereas the regulated voltage on the supply lead 42 is higher and, preferably about 9.1 volts. A smoothing and filtering capacitor 36 is connected in parallel with the resistor 34 and a capacitor 40 having a similar function is connected in parallel with the resistor 38.

The junction of the thermocouple 50 has its positive lead 52 connected to a reference junction 53 at the regulated low-voltage supply lead 44. The negative lead 54 of the thermocouple is connected to a junction 55. An input resistor 58 is connected between the junction 55 and the negative input 62 to the operational amplifier 64. Similarly, an input resistor 56, which in use carries a variable current used for purposes of thermocouple 50 ambient temperature compensation and circuit calibration, is connected between the reference junction 53 and the positive input 60 to the operational amplifier 64. A capacitor 66 is connected across the positive and negative inputs to the amplifier 64 for the purpose of filtering and smoothing the input signal. The negative supply lead to the amplifier 64 is connected to ground at 70 and its positive supply voltage is obtained via a lead 68 connected to the regulated higher-voltage supply lead 42.

The output 72 of the amplifier 64 has a feedback resistor 74 connected between it and the positive input terminal 60 to the amplifier. The function of the feedback resistor 74 is to provide positive feedback to the positive terminal of the amplifier 64 such that, once a millivoltage is applied across the amplifier input terminals to cause its output 72 to increase to its maximum value, a portion of this output voltage is fed back to the input to add to the initial input voltage. This establishes a hysteresis in the amplifier circuit which permits the amplifier to go to a maximum voltage level when the thermocouple 50 senses a predetermined temperature, but which prevents the amplifier output voltage from going to a low-level unless the thermocouple senses a predetermined temperature substantially less than that which initially caused the amplifier output to increase to its maximum voltage level.

The right-hand terminal of the input resistor 56 is connected through a resistor 80 to the movable arm 78 of a potentiometer 76. The potentiometer resistance is connected between the regulated low-voltage supply lead 44 and the ground lead 18. In order to obtain a substantially linear calibration of the amplifier circuit by movement of the potentiometer arm, resistor 80 should be much greater in value than the potentiometer resistance.

A temperature-compensating semiconductor PN-junction device in the form of a diode 84 has its anode connected to the regulated low-voltage supply lead 44 and has its cathode connected through a resistor 86 to the ground lead 18. Thus, diode 84 and resistor 86 are connected in series between supply lead 44 and ground lead 18. A lead 87 connects the junction formed between the diode 84 and the resistor 86 to one terminal of a resistor 88. The other terminal of the resistor 88 is connected through a resistor 90 to the ground lead 18. The junction formed between the resistor 88 and the resistor 90 is connected by a lead 91 to the amplifier-input junction 60 formed between the right-hand terminal of the resistor 56 and the positive input to the amplifier 64.

In the operation of the thermocouple 50 and the operational amplifier 64, only a differential voltage of a few millivolts applied across the amplifier inputs 60 and 62, input 60 being positive with respect to input 62, is sufficient to cause the amplifier output 72 to reach a maximum voltage level. The output voltage of the thermocouple 50 at a particular temperature depends upon the materials comprising the thermocouple. For example, the thermocouple 50 may produce a voltage signal of 36 millivolts at a temperature at which it is desired to have the amplifier output 72 reach its maximum voltage level. The junction 53 is a reference voltage junction and is at the highest voltage point in the thermocouple-controlled amplifier input circuitry. This reference junction 53 voltage, for example, may be a regulated 5.0 volts as previously described, and this voltage, minus the millivoltage signal developed across the thermocouple 50, is applied through the thermocouple to the junction 55.

Since no appreciable current flows through the resistor 58, the negative input 62 to the amplifier 64 is at the same potential as is the junction 55. However, a variable current flows from the reference junction 53, through the resistor 56 and into the amplifier input 60. The input 60 to the amplifier 64 is at a potential less than that at the reference junction 53 due to the current flow through the resistor 56. The magnitude of this potential difference is directly proportional to the current in the resistor 56 and acts in opposition to the voltage signal developed by the thermocouple 50. If the voltage drop across the resistor 56 were, for example, 36 millivolts, then the input terminal 60 to the amplifier 64 would start to become positive with respect to the amplifier input 62 when the voltage of the thermocouple 50 began to exceed 36 millivolts. This would cause the output 72 of the amplifier to switch from a low voltage to its maximum voltage.

The voltage drop across the input resistor 56 is determined by the current through this resistor as previously stated. The current through the resistor 56 divides at the junction 60. A portion of this current flows through the resistor 80, through the arm 78 of the potentiometer 76, and through the lower portion of the potentiometer resistance to the ground lead 18. Of course, the magnitude of this current portion is determined by the point at which the arm contacts the potentiometer resistance and variation of this point is used to vary the potential difference across the resistor 56, thereby, to permit calibration of the temperature response at the output of the amplifier circuit.

In addition to the current in the potentiometer circuit, a second portion of the current flowing through the resistor 56 flows through the lead 91 to the junction formed between the resistors 88 and 90. At this junction, this second current portion again divides, a portion of it flowing through the resistor 90 to ground lead 18 and another portion of it flowing through the resistor 88 and through the resistor 86 to the ground lead 18. The presence of the resistor 90 in the circuit makes a contribution to the total current in resistor 56. The amount of current which flows through the resistor 88 and the resistor 86 to the ground lead 18 is variable and determined by the potential existing at the junction formed between the temperature compensating diode 84 and the resistor 86. The diode 84 has a negative temperature coefficient such that the voltage drop or potential difference across it decreases as ambient temperature increases. Thus, as ambient temperature increases, the voltage at the junction between the diode 84 and the resistor 86 increases. This provides a greater impedance to current flowing through the input and calibration resistor 56, thereby, to decrease the current and the potential difference across resistor 56 as ambient temperature increases. As a result, the circuit is compensated for changes in ambient temperature since the thermocouple output voltage also decreases as ambient temperature increases.

When the signal voltage from the thermocouple 50 is sufficient to overcome the voltage drop across the input resistor 56, the output 72 of the operational amplifier 64 switches to its maximum voltage level. This output voltage may be used to actuate or de-actuate a controlled device, thereby, indicating and responding to the occurrence at the thermocouple temperature-sensing junction of the predetermined temperature at which the amplifier circuit is calibrated to respond.

By way of example, and not limitation, the components of the circuit shown in the drawing may have the following values or be of the following types:

| | |
|---|---|
| Resistors 56 and 58 | — one kilohm |
| Resistor 74 | — 1.3 megohm |
| Resistor 80 | — 150 kilohm |
| Resistor 82 | — 470 kilohm |
| Resistor 86 | — 22 kilohm |
| Resistor 88 | — 39 kilohm |
| Resistor 90 | — 470 kilohm |
| Potentiometer 76 resistance | — 2.5 kilohm |
| Diode 84 | — silicon PN-junction diode |

Based upon the foregoing description of the invention, what is claimed is:

1. A thermocouple-controlled operational amplifier circuit which comprises:

an operational amplifier having first and second input terminals;

a first impedance having a first terminal connected to said amplifier first input terminal and having a second terminal;

a thermocouple having a first lead coupled to said second terminal of said first impedance and having a second lead coupled to said amplifier second input terminal;

means for establishing a reference potential at said second terminal of said first impedance;

means for producing a current in said first impedance, said current producing a potential difference across said first and second terminals of said first impedance, said current producing means comprising a potentiometer for connection across the terminals of a source of electrical potential, said potentiometer having a movable arm, a second impedance between said first terminal of said first impedance and said potentiometer arm, movement of said potentiometer arm being capable of varying said current in said first impedance and means for compensating said thermocouple for variations in ambient temperature by the variation of said current in said first impedance, said temperature compensating means including a third impedance having a first terminal coupled to said first terminal of said first impedance and having a second terminal, and a semiconductor PN-junction device, one terminal of said PN-junction device being coupled between said second terminal of said first impedance and said second terminal of said third impedance, said PN-junction device being forward-biased upon application of said reference potential to said second terminal of said first impedance;

whereby, when said thermocouple-controlled operational amplifier circuit is appropriately connected to a source of electrical potential, current flowing through said first impedance may be varied by changes in the position of said potentiometer arm thereby, to permit calibration of said amplifier circuit, and by changes in the potential difference occurring across said PN-junction device, thereby, to achieve compensation of said amplifier circuit for changes in ambient temperature of said thermocouple.

2. A thermocouple-controlled operational amplifier circuit in accordance with claim 1 wherein said means for producing a current in said first resistor further comprises an electrical lead for connection to a source of electrical potential different than said reference potential and a fourth impedance coupled between said first terminal of said first impedance and said electrical lead, thereby, to produce a contribution to the current flowing through said first impedance.

3. A thermocouple-controlled operational amplifier circuit, which comprises:

a DC source of electrical energy;

an operational amplifier having voltage supply leads coupled to said source of electrical energy and having first and second input terminals;

a first resistor having a first terminal connected to said amplifier first input terminal and having a second terminal;

a thermocouple having a first lead coupled to said second terminal of said first resistor and having a second lead coupled to said amplifier second input terminal;

means, coupled to said source of electrical energy, for establishing a DC reference voltage at said second terminal of said first resistor;

means for producing a current in said first resistor, said current producing a potential difference across said first and second terminals of said first resistor, said current producing means comprising a potentiometer coupled to said source of electrical energy, said potentiometer having a movable arm, a second resistor between said first terminal of said first resistor and said potentiometer arm, movement of said potentiometer arm being capable of causing variation in said current in said first resistor, and means for compensating said thermocouple for variations in ambient temperature by the variation of said current in said first resistor, said temperature compensating means including a third resistor having a first terminal coupled to said first terminal of said first resistor and having a second terminal, and a semiconductor PN-junction device, one terminal of said PN-junction device being coupled between said second terminal of said first resistor and said second terminal of said third resistor, said PN-junction device being forward-biased upon application of said reference voltage to said second terminal of said first resistor;

whereby, when said operational amplifier circuit is coupled to said source of electrical energy, current through said first resistor may be varied by movement of said potentiometer arm to achieve calibration of said amplifier circuit and said current through said first resistor is varied as a result of changes in the potential difference across said PN-junction device to compensate said amplifier circuit for changes in ambient temperature of said thermocouple.

4. A thermocouple-controlled operational amplifier circuit in accordance with claim 3 wherein said means for producing a current in said first resistor further comprises a fourth resistor and wherein said PN-junction device is a diode connected in series with said fourth resistor, one of the terminals of said fourth resistor being coupled to said source of electrical energy, said second terminal of said third resistor being connected to the junction formed between said series-connected diode and fourth resistor.

5. A thermocouple-controlled operational amplifier circuit in accordance with claim 3 wherein said means for producing a current in said first resistor further comprises a fifth resistor having a first terminal connected to said first terminal of said first resistor and having a second terminal connected to said source of electrical energy, the presence of said fifth resistor in said amplifier circuit contributing to said current in said first resistor.

6. A thermocouple-controlled operational amplifier circuit in accordance with claim 4 wherein the potential difference produced by said current flowing in said first resistor acts in opposition to the potential difference appearing across said thermocouple first and second leads with respect to the resulting potential difference applied across said first and second input terminals of said operational amplifier.

7. A thermocouple-controlled operational amplifier circuit, which comprises:

a DC source of electrical energy;

an operational amplifier having first and second input terminals;

a first resistor having a first terminal connected to said amplifier first input terminal and having a second terminal;

means, coupled to said source of electrical energy, for producing a DC reference voltage at said second terminal of said first resistor;

a potentiometer, the resistance of said potentiometer being coupled at its opposite terminals to said source of electrical energy, said potentiometer having a movable arm for contacting said potentiometer resistance at variable locations thereon;

a second resistor, said second resistor having a first terminal connected to said first terminal of said first resistor and having a second terminal coupled to said potentiometer arm;

a third resistor having a first terminal connected to said first terminal of said first resistor and having a second terminal;

a diode having first and second terminals, said first terminal of said diode being connected to said second terminal of said first resistor at which terminal said reference voltage occurs;

a fourth resistor having a first terminal connected to said second terminal of said diode and having a second terminal connected to said source of electrical energy, said diode and said fourth resistor being connected in series, and said second terminal of said third resistor being connected to the junction formed between said diode and said fourth resistor;

a thermocouple having a first lead and a second lead, said first lead being connected to said second terminal of said first resistor;

a fifth resistor having a first terminal connected to said second lead of said thermocouple and having a second terminal connected to said second input terminal of said amplifier;

whereby, the voltage applied across said first and second input terminals to said amplifier is determined by the summation of voltages occurring across said first and second thermocouple leads, across said first resistor, and across said fifth resistor; and said first resistor, said amplifier input leads and said thermocouple being polarized such that, when current flows through said first resistor, the potential difference thereby produced across its first and second terminals acts in opposition to the voltage occurring across said first and second thermocouple leads, whereby, said thermocouple-controlled operational amplifier circuit may be compensated for changes in ambient temperature of said thermocouple by changes in said current flowing in said first resistor as a result of changes in the potential difference across said diode and said current may be varied and said amplifier circuit calibrated by movement of said potentiometer arm.

8. A thermocouple-controlled operational amplifier circuit in accordance with claim 7 wherein said circuit further comprises a sixth resistor having a first terminal connected to said first terminal of said first resistor and having a second terminal connected to said source of electrical energy, said sixth resistor contributing to said current flowing in said first resistor.

* * * * *